UNITED STATES PATENT OFFICE.

EDUARD MEYER, OF FRIEDRICHSWERTH, GERMANY.

ROASTED SULFURIZED GRAIN.

945,567.  Specification of Letters Patent.  Patented Jan. 4, 1910.

No Drawing.  Application filed January 2, 1908. Serial No. 408,887.

*To all whom it may concern:*

Be it known that I, EDUARD MEYER, landlord, subject of the King of Prussia, residing at Friedrichswerth i. Th., in Germany, have invented new and useful Improvements in Roasted Sulfurized Grain, of which the following is a specification.

It is well known that roasted grain exercises a favorable dietetic action on the digestive organs, and thus for instance, malt-coffee and similar preparations have been used extensively already.

It has hitherto been suggested, for the purpose of increasing the proportion of sulfur in such roasted products, to roast grain with the addition of sulfur until it becomes carbonized and tar is formed. Products obtained in this manner were intended to be used as an addition to the food of men or animals, as they have a special physiological action both on human and animal organisms, having a stimulating action, assisting secretion and bringing about a favorable and regular formation of gases in the intestine, whereby the stagnation of fecular substances therein is avoided. If, however, grain, for example, wheat, rye, barley or the like, be roasted until it becomes carbonized and an oily substance appears, and it is then treated hot with sulfur, the sulfur and the empyreumatic organic substances formed during the roasting process are liable to be burned, whereby the quality is impaired, and the output reduced.

In order to obviate the above deficiencies, the process according to this invention consists in adding to the grain during roasting not only sulfur, but also suitable mineral salts such as, for instance, phosphate of lime, iron oxid compounds or the like which, being incombustible, exercise a damping action on the roasting process, and by excluding the oxygen of the air, prevent oxidation and therefore destruction of the empyreumatic products formed. These substances participate, however, mechanically and chemically in the reaction of the hot organic roasted material, as the said salts are absorbed by the roasted material in organic chemical combination. This absorption is accelerated if the salts be previously heated to about 300° C. The sulfur composition must be added to the grain, when it is heated but before any carbonization or formation of tar sets in. After the addition of the sulfur composition the temperature rises, caused by the combination of the sulfur composition with the grain, and the roasting process continues for some short time. The product cools after the reaction is finished and the product is ready for use.

Products obtained in that manner are intended to be used in suitably pulverized form, as an addition to human and animal food, or in pure form as medical or aromatic dietetic substances.

The process can be carried out for example as follows: For 100 kilos of any desired grain are used 10 kilos of sulfur and 1-2 kilos pulverized phosphate of lime, oxid of iron or the like. The grain is heated at first, and as soon as it begins to roast, but before it commences to carbonize, and before tar begins to form, the fires are damped, so that the temperature shall not rise, but on the contrary descend. at this stage the mixture of sulfur and of phosphate preferably previously heated, is added and the whole compound is stirred. The grain being hot, the phosphates and sulfur combine with the grain. The temperature rises and the roasting process continues, and very soon a homogeneous compound is produced, whereupon the product is allowed to cool, and thereafter may be pulverized, if the purpose for which it is designed requires it. The preliminary heating of the sulfur-phosphate mixture must of course not be carried to such an extent as to burn the sulfur.

Having now particularly described and ascertained the nature of my said invention and in what manner the same is to be performed, I declare that what I claim is:—

1. The process of manufacturing sulfur-containing roasted products from grain, consisting in first heating the grain and then mixing the grain while heated with sulfur and mineral salts, substantially as described.

2. The process of manufacturing sulfur-containing roasted products from grain, consisting in heating the grain then mixing therewith sulfur and mineral salts, and then raising the heat to the point of carbonization, substantially as described.

3. The herein described food product consisting of a mixture of sulfurized grain and mineral salts, carbonized substantially as set forth.

In testimony whereof I have signed my name to this specification in the presence of two subscribing witnesses.

EDUARD MEYER.

Witnesses:
HENRY HASPER,
WOLDEMAR HAUPT.